United States Patent [19]  [11] 4,206,289
Meiners et al.  [45] Jun. 3, 1980

[54] PROCESS FOR THE PRODUCTION OF COLD-CURING FOAM RESINS WHICH CONTAIN URETHANE GROUPS

[75] Inventors: Hans-Joachim Meiners, Leverkusen; Klaus Seyfried, Bergisch Gladbach; Armand de Montigny, Leverkusen; Rolf Baumhäkel, Odenthal, all of Fed. Rep. of Germany

[73] Assignee: Bayer Aktiengesellschaft, Leverkusen, Fed. Rep. of Germany

[21] Appl. No.: 6,988

[22] Filed: Jan. 29, 1979

Related U.S. Application Data

[63] Continuation-in-part of Ser. No. 925,076, Jul. 17, 1978, abandoned, which is a continuation of Ser No. 798,225, May 18, 1977, abandoned, which is a continuation-in-part of Ser. No. 646,771, Jan. 6, 1976, abandoned.

[30] Foreign Application Priority Data

Jan. 23, 1975 [DE] Fed. Rep. of Germany ....... 2502658

[51] Int. Cl.$^2$ ...................... C08G 18/14; C08G 18/38; C07F 7/08
[52] U.S. Cl. .................................. 521/110; 521/904; 556/455
[58] Field of Search ........................................ 521/110

[56] References Cited

U.S. PATENT DOCUMENTS

| | | | |
|---|---|---|---|
| 3,012,052 | 12/1961 | Simmler | 252/78.3 |
| 3,741,917 | 6/1973 | Morehouse | 260/2.5 AH |
| 3,839,384 | 10/1974 | Morehouse | 260/2.5 AH |
| 3,884,847 | 5/1975 | Pruvost | 521/110 |
| 3,896,062 | 7/1975 | Morehouse | 260/2.5 AH |

FOREIGN PATENT DOCUMENTS

| | | |
|---|---|---|
| 1046049 | 12/1958 | Fed. Rep. of Germany . |
| 2135674 | 7/1974 | Fed. Rep. of Germany . |
| 1381571 | 1/1975 | United Kingdom ..................... 521/110 |

*Primary Examiner*—H. S. Cockeram
*Attorney, Agent, or Firm*—Gene Harsh

[57] ABSTRACT

A process for making cold-setting, non-shrinkable polyurethane foam resins using a mixture of silicon compounds of the formula:

$$A_x B_{x+2}$$

wherein
$x = 2-25$, preferably 2-5
A is the group $R' \, Si \, O_{3/2}$
B is the group $(R)_3 \, Si \, O_{1/2}$
R represents an alkyl group having from 1 to 3 carbon atoms
R' represents an aryl group having from 6 to 14 carbon atoms, with the proviso that the mixture contains at least one compound wherein x is greater than 3.

4 Claims, No Drawings

PROCESS FOR THE PRODUCTION OF COLD-CURING FOAM RESINS WHICH CONTAIN URETHANE GROUPS

This application is a continuation-in-part of our co-pending application Ser. No. 925,076 filed July 17, 1978, which in turn is a continuation of Ser. No. 798,225 filed May 18, 1977, which in turn is a continuation-in-part of our copending application Ser. No. 646,771 filed January 6, 1976, all now abandoned.

BACKGROUND OF THE INVENTION

Foam resins which contain urethane groups and which are obtained by the reaction of polyisocyanates with particular polyols are widely used in the field of insulations, for the manufacture of structural elements or for upholstery or padding purposes.

It is known to produce cold-curing urethane group-containing foam resins in molds from compounds which contain active hydrogen atoms, preferably polyols, polyisocyanates, water and/or other blowing agents in the presence of emulsifiers, auxiliary agents, catalysts and flame-retarding additives. The function of the emulsifiers and stabilizers is to homogenize the reactants, to facilitate the foaming process and to prevent collapse of the foams after the evolution of gas has ceased. The catalysts ensure that the various processes which take place during formation of the foam are brought into the correct equilibrium with each other and proceed at the proper rate.

Polyethers are frequently used which contain at least two hydroxyl groups and in which at least about 10% of the hydroxyl groups present are primary hydroxyl groups and which generally have molecular weights of from about 750 to about 100,000 and preferably from 4000 to 10,000. These polyethers can be used in combination with certain polyisocyanates to produce cold-curing urethane foams which have the desired physical properties.

The polyisocyanates used may be, for example, the so-called "modified polyisocyanates", e.g. solutions of polyisocyanates which contain biuret groups in polyisocyanates which are free from biuret groups and/or solutions of polyisocyanates containing at least two isocyanate groups and at least one N,N'-disubstituted allophanic acid ester group in polyisocyanates which are free from allophanic acid ester groups and/or solutions of polyisocyanates containing urethane groups in polyisocyanates which are free from urethane groups and/or solutions of polyisocyanates containing isocyanuric acid rings in polyisocyanates which are free from isocyanurate groups.

These cold-curing foam resins with urethane groups have the desired physical properties, but often have defects in the form of bubbles under the surface of the foam. This especially occurs if they are produced by a process which involves simultaneous foaming and shaping, and these defects may also be propagated into the interior of the shaped product. These defects are a serious disadvantage, particularly in the manufacture of shaped parts (which may be used for various purposes, such as the furniture industry or the automobile industry) because the bubbles are clearly seen if the foam is covered with fine textiles. The difficulty cannot be overcome by using commercial polysiloxane-polyalkylene oxide copolymers because they cause irreversible shrinkage even if the stabilizers are only used in minute quantities.

Attempts have been made to overcome the above defects in the production of polyurethane foams by adding certain silicon compounds (see German Offenlegungsschriften Nos. 2,221,811; 2,232,525; 2,337,140 and 2,246,400). These attempts have not so far led to completely satisfactory results. In particular, it has been found that, in many cases, shrinkage of the foam cannot be completely avoided if the silicon compounds specifically described in the said Offenlegungsschriften are used.

German Offenlegungsschriften Nos. 2,211,811 and 2,232,525 (corresponding to British Pat. No. 1,381,571) describe the use of silicon compounds of the formula:

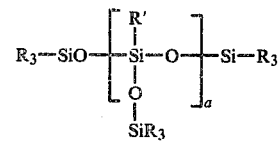

wherein a can be 0, 1, 2 and 3.

A process for the production of non-shrinking, cold-curing foam resins which contain urethane groups has now been found which is based on the use of particular silicon compounds, whereby the disadvantages described above may be obviated and faultless foams may be produced.

DESCRIPTION OF THE INVENTION

The present invention therefore relates to a process for the production of cold-curing, non-shrinking foam resins which contain urethane groups by foaming a mixture of polyethers with a molecular weight of from 750 to 100,000 which contain at least two hydroxyl groups, polyisocyanates, water and/or organic blowing agents, silicon compounds and optionally catalysts and other auxiliary agents, characterized in that the silicon compounds used correspond to a mixture of compounds of the following general formula:

$$A_x B_{x+2}$$

wherein
- $x = 2\text{-}25$, preferably 2-5
- A is the group $R'\,Si\,O_{3/2}$
- B is the group $(R)_3\,Si\,O_{1/2}$
- R represents an alkyl group having from 1 to 3 carbon atoms
- R' represents an aryl group having from 6 to 14 carbon atoms, with the proviso that the mixture contains at least one compound wherein x is greater than 3.

The silicon compounds to be used according to the invention are known and may be obtained, for example, in accordance with the teaching of German Pat. No. 1,046,049 (U.S. Pat. No. 3,012,052) or of German Auslegeschrift No. 2,135,674, the disclosures of which are herein incorporated by reference.

The following are typical examples of materials which can be present in the mixtures of the instant invention:

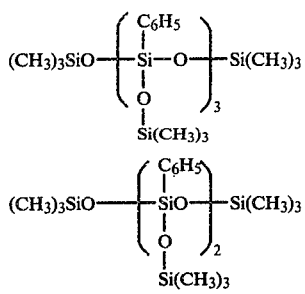

It has surprisingly been found that the invention also provides the following technical advantages:

1. The mixtures of silicon compounds used in the present invention are soluble in the polyols used and thus obviate difficulties in storage. The dissolved additives improve the flow properties and promote formation of nuclei in the foaming process. Such factors are necessary for optimum results in the manufacture of foams which are shaped in apparatus which have long flow paths or widely fluctuating cross-sections.

2. Highly elastic shaped products with an exceptionally good hand may be obtained under conventional foaming conditions and with conventional formulations. In other words, the indentation load deflection curves of the products are improved.

3. The silicon compounds used in the invention have the particular advantage that their activity is a function of the number of siloxy units present. The additives can therefore be easily adapted to changes in foam formulations. The possibility of grading the stabilizing effect has the additional advantage that the force required for compressing molded foams can be minimized.

The polyisocyanates used as starting components in the invention may be aliphatic, cycloaliphatic, araliphatic, aromatic or heterocyclic, for example, the polyisocyanates described by W. Siefken in Justus Liebigs Annalen der Chemie, 562, pages 75 to 136. The following are examples: ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3-and -1,4-diisocyanate and mixtures of these isomers; 1-isocyanate-3,3,5-trimethyl-5-isocyanatomethyl-cyclohexane (U.S. Pat. No. 3,401,190); hexahydrotolylene-2,4- and -2,6-diisocyanate and mixtures of these isomers; hexahydrophenylene-1,3- and/or -1,4-diisocyanate; perhydro-2,4'- and/or 4,4'-diphenylmethane diisocyanate; phenylene-1,3- and -1,4-diisocyanate; tolylene-2,4-and -2,6-diisocyanate and mixtures of these isomers; diphenylmethane-2,4'- and/or - 4,4'-diisocyanate; naphthylene-1,5-diisocyanate; triphenylmethane-4,4', 4''-triisocyanate; polyphenyl-polymethylene polyisocyanates which may be obtained by aniline-formaldehyde condensation followed by phosgenation as described, e.g. in British Pat. Nos. 874,430 and 848,671, m- and p-isocyanatophenyl-sulphonyl isocyanates as in U.S. Pat. No. 3,454,606; perchlorinated aryl polyisocyanates as described, e.g. in U.S. Pat. No. 3,227,138; polyisocyanates which contain carbodiimide groups as described in U.S. Pat. No. 3,152,162; the diisocyanates described in U.S. Pat. No. 3,492,330; polyisocyanates which contain allophanate groups as described, e.g. in British Pat. No. 994,890, Belgian Pat. No. 761,626 and published Dutch Patent Application No. 7,102,524; polyisocyanates which contain isocyanurate groups as described, e.g. in U.S. Pat. No. 3,001,973; in German Pat. Nos. 1,022,789; 1,222,067 and 1,027,394; and in German Offenlegungsschriften Nos. 1,929,034 and 2,004,048; polyisocyanates which contain urethane groups as described, e.g. in Belgian Pat. No. 752,261 or in U.S. Pat. No. 3,394,164; polyisocyanates which contain acylated urea groups in accordance with German Pat. No. 1,230,778; polyisocyanates which contain biuret groups as described, e.g. in U.S. Pat. Nos. 3,124,605 and 3,201,372 and in British Pat. No. 889,050; polyisocyanates prepared by telomerization reactions as described, e.g. in U.S. Pat. No. 3,654,106; polyisocyanates which contain ester groups as described, for example, in British Pat. Nos. 965,474 and 1,072,956, in U.S. Pat. No. 3,567,763 and in German Pat. No. 1,231,688; reaction products of the above-mentioned isocyanates with acetals in accordance with German Pat. No. 1,072,385; and polyisocyanates which contain polymeric fatty acid radicals in accordance with U.S. Pat. No. 3,455,883.

The distillation residues obtained from the commercial production of isocyanates and still containing isocyanate groups may also be used. If desired they may be used as solutions in one or more of the above-mentioned polyisocyanates. Mixtures of the above-mentioned polyisocyanates may also be used.

It is generally preferred to use readily available polyisocyanates, e.g. tolylene-2,4-diisocyanate and tolylene-2,6-diisocyanate and mixtures of these isomers ("TDI"), polyphenyl-polymethylene polyisocyanates prepared by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

Monofunctional isocyanates, such as propyl isocyanate, cyclohexyl isocyanate, phenyl isocyanate, tolyl isocyanate and p-chlorophenyl isocyanate may also be used, but they should not amount to more than 20%, by weight, of the combination of isocyanates used, based on the isocyanate content.

The starting materials used for the process of the invention also include polyethers which contain at least two, generally from two or eight, and preferably two or three hydroxyl groups, and which generally have a molecular weight of from 750 to 100,000. Polyethers of this type are known and may be prepared, e.g. by the polymerization of epoxides, such as ethylene oxide, propylene oxide, butylene oxide, tetrahydrofuran, styrene oxide or epichlorohydrin. These compounds may be reacted alone, for example, in the presence of boron trifluoride, or by an addition reaction of these epoxides, if desired as mixtures or successively, to starting components which contain reactive hydrogen atoms, such as alcohols or amines (e.g. water, ethylene glycol, propylene-1,3- or -1,2-glycol, trimethylolpropane, 4,4'-dihydroxydiphenylpropane aniline, ammonia, ethanolamine or ethylene diamine). It is frequently preferred to use polyethers which contain predominantly primary OH-groups (up to 90%, by weight, based on all the OH-groups in the polyether). Polyethers which are modified with vinyl polymers, for example, the compounds obtained by the polymerization of styrene or acrylonitrile in the presence of polyethers (U.S. Pat. Nos. 3,383,351; 3,304,273; 3,523,093 and 3,110,695 and German Pat. No. 1,152,536). Polybutadienes which contain OH-groups are also suitable.

Among the polythioethers which should be particularly mentioned are the condensation products of thiodiglycol on its own or with other glycols, dicarboxylic acids, formaldehdye, aminocarboxylic acids or amino alcohols. The products obtained are polythio mixed ethers, polythio ether esters or polythio ether ester amides, depending on the co-components.

The polyethers mentioned above may also be modified by reacting them with less than equivalent quantities of polyisocyanates.

The higher molecular weight polyethers to be used in the invention may also be mixed with low-molecular weight compounds containing active hydrogen atoms, i.e. with molecular weights of up to 750, or they may be mixed (up to 50%, by weight, based on the polyether) with other higher molecular weight compounds containing active hydrogen atoms. Suitable low-molecular weight compounds with active hydrogen atoms are mainly compounds with hydroxyl groups, for example, ethylene glycol, 1,3-butylene glycol, 1,4-butylene glycol, glycerol, trimethylolpropane or castor oil or adducts (molecular weights generally from 200 to 750) of alkylene oxides, such as ethylene oxide, propylene oxide or butylene oxide, with such low-molecular weight compounds containing active hydrogen atoms or with water. Higher molecular weight compounds with active hydrogen atoms used in the invention are known compounds, and include polyacetals, polyesters, polyester amides or polycarbonates.

Suitable polyacetals may be obtained, for example, from glycols, such as diethylene glycol, triethylene glycol, 4,4'-dioxethoxy-diphenyldimethylmethane, hexanediol and formaldehyde. Polyacetals suitable for the purpose of the invention may also be prepared by the polymerization of cyclic acetals.

Suitable polycarbonates with hydroxy groups are known. Such compounds may be obtained by the reaction of diols, such as propane-1,3-diol, butane-1,4-diol and/or hexane-1,6-diol, diethylene glycol, triethylene glycol or tetraethylene glycol, with diaryl carbonates, e.g. diphenyl carbonate or phosgene.

Suitable polyester amides and polyamides include, for example, the predominantly linear condensates which may be obtained from polyvalent saturated and unsaturated amino alcohols, diamines, polyamines and mixtures thereof.

Polyhydroxyl compounds which already contain urethane or urea groups and modified or unmodified natural polyols, such as castor oil, carbohydrates or starch may also be used. Addition products of alkylene oxides with phenol-formaldehyde resins or with urea-formaldehyde resins may also be used in the invention.

Representatives of these compounds which may be used in the invention have been described, for example, in High Polymers, Volume XVI "Polyurethanes, Chemistry and Technology" by Sanders-Frisch, Interscience Publishers, New York, London, Volume 1, 1962, pages 32–42 and pages 44–54 and Volume II, 1964, pages 5–6 and 198–199 and in Kunststroff-Handbuch, Volume VII, Vieweg-Höchtlen, Carl Hanser Verlag, Munich, 1966, e.g. on pages 45–71.

According to the invention, water and/or readily volatile organic substances are used as blowing agents. Suitable organic blowing agents include, e.g. acetone, ethyl acetate, halogenated alkanes, such as methylene chloride, chloroform, ethylidene chloride, vinylidene chloride, monofluorotrichloromethane, chlorodifluoromethane or dichlorodifluoromethane, butane, hexane, heptane or diethyl ethers. Compounds which decompose at temperatures above room temperature to liberate gases, such as nitrogen, may also be added as blowing agents. Examples include zero compounds, such as azoisobutyric acid nitrile. Other examples of blowing agents and details concerning their use may be found in Kunstroff Handbuch, Volume VII, published by Vieweg and Höchtlen, Carl Hanser Verlag, Munich 1966, e.g. on pages 108 and 109, 453, to 455 and 507 to 510.

Catalysts may often be used in the process of the present invention. Known catalysts are suitable, e.g. tertiary amines, such as triethylamine, tributylamine, N-methyl morpholine, N-ethyl morpholine, N-cocomorpholine, N,N,N', N'-tetramethyl-ethylene diamine, 1,4-diaza-bicyclo-(2,2,2)-octane, N-methyl-N'-dimethyl-aminoethyl-piperazine, N,N-dimethyl benzylamine, bis-(N,N-diethylaminoethyl)-adipate, N,N,-diethylbenzylamine, pentamethyl diethylene triamine, N,N-dimethyl-cyclohexylamine, N,N,N'N'-tetramethyl-1,3-butane diamine, N,N-dimethyl-$\beta$-phenyl ethylamine, 1,2-dimethyl imidazole or 2-methyl imidazole. The known Mannich bases of secondary amines, such as dimethylamine, and aldehydes, preferably formaldehyde, or ketones, such as acetone, methyl ethyl ketone or cyclohexanone, and phenols, such as phenol, nonylphenol or bisphenol, may also be used as catalysts.

Certain tertiary amines containing hydrogen atoms which are reactive with isocyanate groups may be used as catalysts, e.g. triethanolamine, triisopropanolamine, N-methyl diethanolamine, N-ethyl diethanolamine, N,N-dimethyl ethanolamine and their reaction products with alkylene oxides, such as propylene oxide and/or ethylene oxide.

Silaamines with carbon-silicon bonds as described for example, in U.S. Pat. No. 3,620,894 may also be used as catalysts. Examples include 2,2,4-trimethyl-2-silamorpholine or 1,3-diethylaminomethyl-tetramethyl disiloxane.

Other suitable catalysts include basic nitrogen compounds, such as tetraalkyl ammonium hydroxides, alkali metal hydroxides, such as sodium hydroxide, alkali metal phenolates, such as sodium phenolate, and alkali metal alcoholates, such as sodium methylate. Hexahydrotriazines are also suitable catalysts.

Organic metal compounds may be used as catalysts in the invention, particularly organic tin compounds.

The organic tin compounds are preferably tin(II) salts of carboxylic acids, such as tin(II) acetate, tin(II) octoate, tin(II) ethyl hexoate and tin(II) laurate, and the tin(IV) compounds, such as dibutyl tin oxide, dibutyl tin dichloride, dibutyl tin diacetate, bibutyl tin dilaurate, dibutyl tin maleate and dioctyl tin diacetate. All of the catalysts mentioned above may, of course, be used as mixtures.

Other examples of catalysts which may be used in the invention and their mode of action have been described in Kunststoff-Handbuch, Volume VII, published by Vieweg and Höchtlen, Carl Hanser Verlag, Munich 1966, e.g. on pages 96 to 1102.

The catalysts are generally used in a quantity of from about 0.001 to 10%, by weight, based on the quantity of compounds with a molecular weight of from about 400 to about 100,000 which contain at least two hydrogen atoms which are reactive with isocyanates.

Surface-active additives, such as emulsifiers, may also be used in the present invention. Suitable emulsifiers include, e.g. the sodium salts of ricinoleic sulphonates or salts of fatty acids with amines, such as oleic acid diethylamine or stearic acid diethanolamine. Alkali metal or ammonium salts of sulphonic acids, such as dodecyl benzene sulphonic acid or dinaphthyl methane disulphonic acid, or of fatty acids, such as ricinoleic acid, or of polymeric fatty acids, may also be used as surface-active additives.

The foam stabilizers used are mainly polyether siloxanes, especially the water-soluble ones. The structure of these compounds is generally such that a copolymer of ethylene oxide and propylene oxide is attached to a polydimethyl siloxane radical. Foam stabilizers of this type have been described, e.g. in U.S. Pat. Nos. 2,834,748; 2,917,480 and 3,629,308.

According to the invention, reaction retarders, e.g. substances which are acidic in reaction, such as hydrochloric acid or organic acid halides may also be used. Known cell regulators, such as paraffins, fatty alcohols or dimethyl polysiloxanes; pigments; dyes; known flame-retarding agents, such as tris-chloroethyl phosphate, tricresyl phosphate or ammonium phosphate and ammonium polyphosphate; stabilizers against ageing and weathering; plasticizers; fungistatic and bacteriostatic substances and fillers, such as barium sulphate, kieselguhr, carbon black or whiting, may also be used in the present invention.

Other examples of surface-active additives and foam stabilizers which may be used, as well as cell regulators, reaction retarders, stabilizers, flame-retarding substances, plasticizers, dyes and fillers and fungistatic and bacteriostatic substances and details concerning their use and mode of action may be found in Kunststoff-Handbuch, Volume VII, published by Vieweg and Höchtlen, Carl Hanser Verlag, Munich 1966, e.g. on pages 103 to 113.

In the invention, the starting materials are reacted together by the known one-step process, prepolymer process or semi-prepolymer process, in many cases using mechanical devices such as those described in U.S. Pat. No. 2,764,565. Processing apparatus which may also be used has been described in Kunststoff-Handbuch, Volume VII, published by Vieweg and Höchtlen, Carl Hanser Verlag, Munich 1966, e.g. on pages 121 to 205.

The foams are preferably produced by foaming in molds. The reaction mixture is introduced into a mold which may be made of a metal, such as aluminum, or a synthetic resin, e.g. an epoxide resin. Inside the mold, the reaction mixture foams to form the molded product. Foaming inside the mold may either be carried out to produce a product which has a cellular structure on its surface or it may be carried out to produce a product with a compact skin and cellular core. One may either introduce just sufficient reaction mixture into the mold to fill the mold when the mixture has foamed or a larger quantity of reaction mixture may be introduced, in which case foaming is said to be carried out under conditions of "overcharging". This method has been described, e.g. in U.S. Pat. Nos. 1,178,490 and 3,182,104.

When foaming is carried out inside molds, known so-called "external mold-release agents" such as silicone oils, are frequently employed, but if desired, so-called "internal mold-release agents" such as those described for example, in German Offenlegungsschrift Nos. 2,121,670 and 2,307,589 may be used. If desired, mixtures of internal and external release agents may be used.

Cold-curing foams can be produced according to the present invention (see British Pat. No. 1,162,517 and German Offenlegungsschrift No. 2,153,086). If desired, foams produced under conditions of free expansion may, of course, also be obtained by the process of the invention.

The products which are obtainable according to the invention may be put to a variety of known uses, for example as upholstery materials.

METHOD OF PREPARATION AND ISOLATION OF THE SILICON COMPOUNDS USED ACCORDING TO THE INVENTION

A mixture of polymer homologues of phenyl methyl polysiloxanes is prepared according to the teaching of German Patent No. 1,046,049.

METHOD OF ISOLATION (A):

The mixture is separated into its components by fractional distillation in a column filled with filling bodies. The following fractions of silicon compounds corresponding to the following general formula:

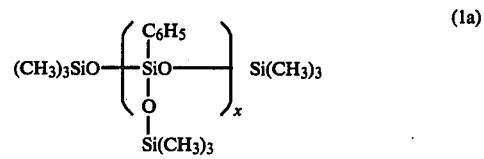

are collected:

| 1. 90° C./1 mmHg Composition: | | | |
|---|---|---|---|
| | x = 0 | 2.5 | percent, by weight |
| | x = 1 | 97.5 | percent, by weight |
| 2. 158° C./0.8 mmHg | | | |
| | x = 1 | 1 | percent, by weight |
| | x = 2 | 98.5 | percent, by weight |
| | x = 3 | 0.5 | percent, by weight |
| 3. 195° C./0.3 mmHg | | | |
| | x = 2 | 10 | percent, by weight |
| | x = 3 | 85 | percent, by weight |
| higher homologues | | 5 | percent, by weight |

METHOD OF ISOLATION (B):

The mixture of polymer homologues of phenyl methyl polysiloxanes is separated into components by distillation without a fractionating column. First runnings are removed at normal pressure and at a temperature of up to 150° C. in the distillation sump. All the components which evaporate at a pressure of 0.5 mmHg and a sump temperature of up to 225° C. are then distilled off. The distillate is found to have the following composition:

| Silicon compounds of the above-mentioned general formula (1a) containing: | x = 1 | 64 | percent, by weight |
|---|---|---|---|
| | x = 2 | 22.3 | percent, by weight |
| | x = 3 | 3.3 | percent, by weight |

According to the gel chromatogram, the residue consists mainly of silicon compounds of formula (1 a) wherein x=3 and the next higher homologue, but still higher homologues with up to about 22 silicon atoms altogether only amount to 10%, by weight. The average molecular weight of this residue (numerical average) is approximately 1000. The distillate obtained at reduced pressure and the residue are mixed in proportions of 55 : 45 parts, by weight.

EXAMPLES (A) The following 5 examples were carried out under identical experimental conditions:

| | |
|---|---|
| Temperature of components: | +25° C. |
| Speed of stirrer: | 2000 revs per min |
| Mixing time: | 10 sec |
| Accuracy of dosing | |
| polypropylene glycol, isocyanate water, silicon compound | ±0.1 g |
| diazabicyclo-2,2,2-octane, triethanolamine and triethylamine | ±0.002 g |

(B) The flow resistances indicated were determined in mm of water column by the Dow-air-flow-method and are a measure of the openness of the cells.

The compression forces (for the crushing cells) were determined on a test sample by the method of DIN 53 577 (pressure test) as the pressure difference between the first compression on the fresh material and the fourth compression. The results are therefore substantially independent of the bulk density.

EXAMPLE 1

(A) 100 parts, by weight, of a polypropylene glycol which was started on trimethylolpropane and modified with ethylene oxide to result in 60% of primary hydroxyl groups in end positions and an OH-number of 35,
2.5 parts, by weight, of water,
0.6 part, by weight, of diazabicyclo-2,2,2-octane,
1.0 part, by weight, of triethanolamine and
1.0 part, by weight, of triethylamine; and
(B) 1.0 part, by weight, of the silicon compounds of formula (1 a) wherein $x=1$ obtained by the method of isolation (A) are mixed and reacted in a mold with:
(C) 41.4 parts, by weight, of an isocyanate mixture consisting of 40%, by weight, of a tolylene diisocyanate mixture (2,4- and 2,6-isomer in proportions of 65:35) and 60%, by weight, of a polyphenyl-polymethylene polyisocyanate (viscosity approximately 200 cP at 25° C.). The polyphenyl-polymethylene polyisocyanate was obtained by anilineformaldehyde condensation followed by phosgenation.
(D) A foam with the following mechanical properties is obtained:

| | | | |
|---|---|---|---|
| Bulk density | DIN 53420 | (kg/m³) | 45 |
| Tensile test | DIN 53571 | (KPa) | 60 |
| Elongation at break | DIN 53571 | (%) | 100 |
| Pressure test | DIN 53577 | (KPa) | 2.0 |
| Flow resistance | | (mm water column) | 30 |
| Compression force | | (N)* | 8 |
| Pore structure | | | medium fine |

*N- Newton

EXAMPLE 2

(A) The polyether mixture described under (A) in Example 1; and
(B) 1.0 part, by weight, of the silicon compounds of the formula (1 a) in which $x=2$ obtained by the method of isolation (A); are mixed and reacted with:
(C) 41.4 parts, by weight, of a isocyanate mixture described under (C) of Example 1.
(D) A foam resin with the following mechanical properties is obtained:

| | | |
|---|---|---|
| Flow resistance | (mm water column) | 50 |
| Compression force | (N) | 25 |
| Pore structure | | fine |

EXAMPLE 3

(A) The polyether mixture described under (A) of Example 1; and
(B) 1.0 part, by weight, of the silicon compounds of formula (1 a) in which $x=3$ obtained by the method of isolation (A); are mixed and reacted with:
(C) 41.4 parts, by weight, of an isocyanate mixture described under (C) of Example 1.
(D) A foam resin with the following mechanical properties is obtained:

| | | |
|---|---|---|
| Flow resistance | (mm water column) | approx. 300 |
| Compression force | (N) | approx. 60 |
| Pore structure | | very fine |

EXAMPLE 4

(A) The polyether mixture described under (A) of Example 1; and
(B) 0.3 part, by weight, of the silicon compound described in Example 3; are mixed and reacted with:
(C) 41.4 parts, by weight, of an isocyanate mixture described in Example 1.
(D) A foam resin with the following mechanical properties is obtained:

| | | |
|---|---|---|
| Flow resistance | (mm water column) | 80 |
| Compression force | (N) | 40 |

EXAMPLE 5

(A) The polyether mixture described under (A) of Example 1; is mixed with
(B) 1.0 part, by weight, of a mixture of silicon compounds of formula (1 a) which has the following composition and which is obtained by the method of isolation (A):

| | | |
|---|---|---|
| $x = 1$ | 80 percent by weight | |
| $x = 2$ | 15 percent by weight | $x = 1.25$ |
| $x = 3$ | 5 percent by weight | |

The mixture of (A) and (B) is reacted with:
(C) 41.4 parts, by weight, of an isocyanate mixture described under (C) of Example 1.
(D) A foam resin with the following mechanical properties is obtained:

| | | |
|---|---|---|
| Flow resistance | (mm water column) | 30 |
| Compression force | (N) | 8 |
| Pore structure | | medium fine to fine |

Examples 1-5 show that the openness of the cells, the compression forces and the pore structures of the foams may be controlled and adjusted to a large extent exactly as required by:
- (a) suitable choice of the silicon compounds used according to the invention; or
- (b) change in the concentration of these compounds; or
- (c) suitably mixing these compounds; or
- (d) a combination of measures (a) to (c).

A change in these various parameters does not affect the activity during production of the foam (starting time, rising time, gel time).

EXAMPLE 6

(A) 100 parts, by weight, of a polypropylene glycol which was started on trimethylolpropane and modified with ethylene oxide to result in 60% of primary hydroxyl groups in end positions and an OH-number of 28, 3.2 parts, by weight, of water and 0.15 parts, by weight, of diazabicyclo-2,2,2-octane are mixed with (B) 0.1 part, by weight, of the methyl phenyl polysiloxane obtained by method of isolation (B); and (C) reacted in a closed mold with 39.0 parts, by weight, of the isocyanate described below:

20 parts of 1,2-propylene glycol are added to a mixture of 225 parts of a mixture of 80%, by weight, of 2,4-tolylene diisocyanate and 20%, by weight, of 2,6-tolylene diisocyanate and 274 parts of 4,4'-diphenylmethane diisocyanate at 60° C., and the mixture is reacted in a metal mold for 30 minutes. After the addition of 1 part of β-phenylethyl-ethylene amine the mixture is heated to 130° C. The trimerization which takes place at this temperature is stopped by the addition of 1 part of methyl p-toluene sulphonate after 2½ hours, when the isocyanate content of the reaction mixture is 26.5%.

The polyisocyanate solution obtained after dilution with 624 parts of an 80/20%, by weight, mixture of 2,4-and 2,6-tolylene diisocyanate is characterized by the following values: %-NCO: 38.4; cP$_{25°}$ C.: 24; n$_D^{50}$: 1.5738.

(D) A molded foam with the following mechanical properties is obtained:

| Bulk density | DIN 53420 | (kg/m$^3$) | 43 |
|---|---|---|---|
| Tensile test | DIN 53571 | (KPa) | 130 |
| Elongation at break | DIN 53571 | (%) | 120 |
| Compression test | DIN 53577 | (KPa) | 3.3 |

EXAMPLE 7

(A) 50 parts, by weight, of a polypropylene glycol which was started on trimethylolpropane and modified with ethylene oxide to result in 60% of primary hydroxyl groups in end positions and an OH-number of 28 and 50 parts, by weight, of a polypropylene glycol which was started on trimethylolpropane and modified with ethylene oxide to result in 70% of primary hydroxyl groups in end positions and which in addition had been grafted with acrylonitrile and styrene in proportions of 60:40 and had an OH-number of 28, 2.7 parts, by weight, of water, 0.15 parts, by weight, of diazabicyclo-2,2,2-octane (as catalyst), 0.08 parts, by weight, of 2,2'-dimethyl aminodiethylether (as catalyst); and (B) 0.5 parts, by weight, of the methyl phenyl polysiloxane obtained according to method of isolation (B); are mixed and (C) reacted in a mold with 34.0 parts, by weight of a tolylene diisocyanate mixture (2,4- and 2,6-isomers in proportions, by weight, of 80:20) and 20.0 parts, by weight, of a polyphenyl-polymethylene polyisocyanate obtained by aniline-formaldehyde condensation followed by phosgenation.

(D) A molded foam with the following mechanical properties is obtained:

| Bulk density | DIN 53420 | (kg/m$^3$) | 43 |
|---|---|---|---|
| Tensile test | DIN 53571 | (KPa) | 170 |
| Elongation at break | DIN 53571 | (%) | 170 |
| Compression test | DIN 53577 | (KPa) | 4.1 |

What is claimed is:

1. In a process for the production of cold-curing non-shrinking foam resins which contain urethane groups comprising foaming a mixture which comprises polyethers with a molecular weight of from about 750 to about 100,000 which contain at least two hydroxyl groups, polyisocyanates, water and/or organic blowing agents, and silicon compounds, the improvement which comprises including in the foamable reaction mixture a mixture of silicon compounds which correspond to the following general formula:

$$A_xB_x+2$$

wherein
x is 2-25
A is the group R' Si O$_{3/2}$
B is the group (R)$_3$ Si O$_{1/2}$
R represents an alkyl group having from 1 to 3 carbon atoms
R' represents an aryl group having from 6 to 14 carbon atoms with the proviso that the mixture contains at least one compound wherein x is greater than 3.

2. The process of claim 1 wherein R is a methyl group.

3. The process of claim 1 wherein R' is a phenyl group.

4. The process of claim 1 wherein x represents an integer from 2 to 5.

* * * * *